Patented Nov. 25, 1930

1,782,960

UNITED STATES PATENT OFFICE

HARRY ADRIAN ERYSIN, OF MALDEN, AND KRIKOR B. CHICKERING, OF BROCKTON, MASSACHUSETTS

METHOD OF MAKING FOOD PRODUCT

No Drawing.   Application filed November 17, 1927.   Serial No. 234,029.

This invention relates to a food product of the corn-meal class and to a novel method of making the same.

An object of the invention is to provide an improved food product of this type which has a superior flavor when used in making bread, rolls, muffins and other articles of food in which corn-meal is usually used as an ingredient.

We attain this object by roasting the corn before it is ground and while it is in the milk stage and then grinding the roasted kernel into corn-meal.

We will preferably use small kernel corn although a very satisfactory product can be made according to our invention from ordinary field corn or Indian corn.

In carrying out our invention the ears of corn are picked when in the milk stage, that is, when the kernels are still soft and milky and before they begin to harden up and said ears are then placed in an oven and roasted until the kernels are thoroughly dry, the roasting of the kernels being accomplished while still on the cob.

After the corn is sufficiently roasted then the ears of corn are shelled thereby removing the roasted kernels from the cob and the kernels may then be ground in any suitable or usual way to produce corn-meal.

The roasting of the corn on the ear as well as the roasting of it when in the milk stage produces a roasted corn having a peculiarly pleasing flavor.

The roasting of the corn may be accomplished in any approved way but we find that good results are secured by roasting it in a brick oven and in doing this the brick oven is preferably heated to a temperature of about 215° F. at which time the heat would be shut off. The ears of corn in the milk stage are then deposited in the oven and allowed to remain until the oven has cooled. We find that in this way the corn is sufficiently roasted or dried for the purpose of this invention. After the ears of corn have been removed from the oven they are then shelled to remove the kernels therefrom and the roasted kernels are then ground into corn-meal as stated above.

The resulting product, especially when made of small kernel corn, has a remarkably pleasant flavor and makes unusually tasty corn bread, corn rolls, corn muffins, etc.

An advantage which results from our invention is that the roasting of the corn prior to grinding has a sterilizing effect so that the corn-meal embodying our invention will keep indefinitely, whereas ordinary corn-meal is likely to become wormy or webby after a comparatively short time.

The corn-meal made in accordance with our invention is also more easily digestible than ordinary corn-meal.

In carrying out our invention we propose to utilize the entire kernel in making our corn-meal thus producing a food product which contains all the nutriment of the corn.

Either sweet corn, field or fodder corn may be used in making our improved food product although we prefer to use corn having relatively small kernels.

We claim:

The method of making a food product which consists in roasting ears of corn when in the milk stage until the kernels are thoroughly dry, shelling the roasted kernels from the cob and then grinding the shelled kernels into meal.

In testimony whereof we have signed our names to this specification.

HARRY ADRIAN ERYSIN.
KRIKOR B. CHICKERING.